United States Patent
Kobayashi

(10) Patent No.: US 6,782,241 B2
(45) Date of Patent: Aug. 24, 2004

(54) RADIO DEVICE CONTROL TERMINAL APPARATUS, RADIO SYSTEM AND MULTIMEDIA SYSTEM CONSTITUTION METHOD

(75) Inventor: Makoto Kobayashi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 614 days.

(21) Appl. No.: 09/795,356

(22) Filed: Mar. 1, 2001

(65) Prior Publication Data

US 2001/0049268 A1 Dec. 6, 2001

(30) Foreign Application Priority Data

May 31, 2000 (JP) ........................................ 2000-162082

(51) Int. Cl.[7] ................................................. H04B 1/40
(52) U.S. Cl. ...................... 455/88; 455/454; 455/432.1; 455/41.2; 455/319; 455/414.4; 370/465; 370/466; 370/463; 370/469
(58) Field of Search ....................... 455/88, 454, 432.2, 455/414.1, 319, 41.2, 414.4, 435.1, 435.2, 566, 557; 370/465, 466, 463, 469

(56) References Cited

U.S. PATENT DOCUMENTS

| | | | | |
|---|---|---|---|---|
| 5,475,374 A | * | 12/1995 | Moore | 340/825.22 |
| 5,553,069 A | * | 9/1996 | Ueno et al. | 370/315 |
| 5,802,469 A | * | 9/1998 | Nounin et al. | 455/422.1 |
| 6,034,951 A | * | 3/2000 | Du | 370/328 |
| 6,157,630 A | * | 12/2000 | Adler et al. | 370/338 |
| 6,201,962 B1 | * | 3/2001 | Sturniolo et al. | 455/432.2 |
| 6,466,783 B2 | * | 10/2002 | Dahm et al. | 455/414.2 |
| 6,580,704 B1 | * | 6/2003 | Wellig et al. | 370/338 |

FOREIGN PATENT DOCUMENTS

| | | |
|---|---|---|
| JP | 6-225366 | 8/1994 |
| JP | 11298973 A | 10/1999 |

* cited by examiner

Primary Examiner—Marceau Milord
(74) Attorney, Agent, or Firm—Finnegan, Henderson, Farabow, Garrett & Dunner, L.L.P.

(57) ABSTRACT

A plurality of radio devices having a radio communication function establish a radio connection therebetween by exchanging their identifiers, and then exchange their information. Each radio device receives the identifier of another radio device as a destination via a radio device control terminal, and establishes a radio connection without requiring much time and effort of the user when connecting the radio devices. When the radio device control terminal has detected radio devices (stations) in a communicable area (where radio connection can be established) set by its radio communication function, it displays the detected radio devices as targets of radio connection establishment on its coordinate-input-enabled display section. When the user has designated the establishment of a connection between the radio devices on the display section, identifiers necessary for establishing a radio connection between the radio devices are transmitted thereto.

6 Claims, 13 Drawing Sheets

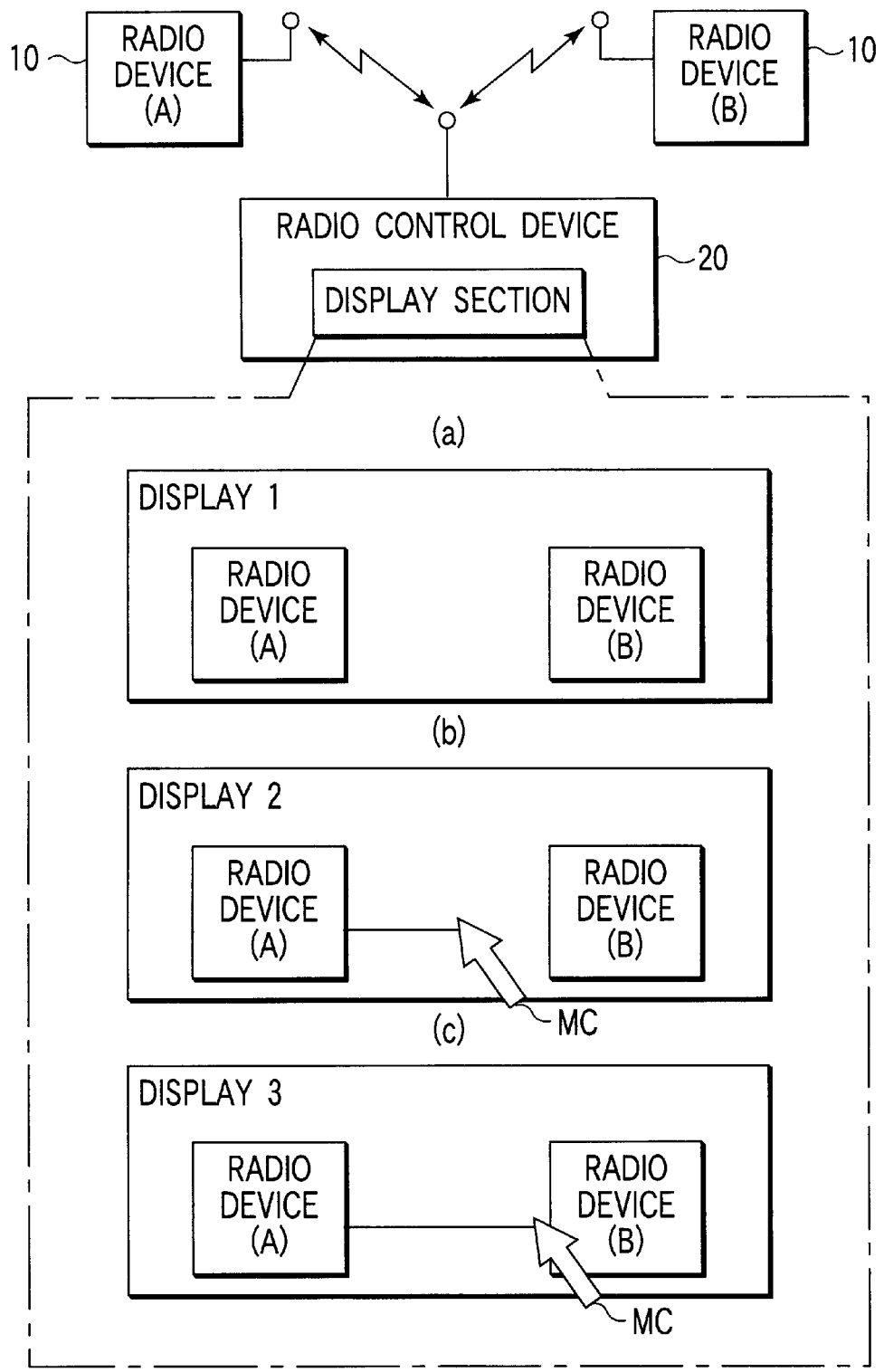
F I G. 1

RADIO DEVICE CONTROL TERMINAL APPARATUS, RADIO SYSTEM AND MULTIMEDIA SYSTEM CONSTITUTION METHOD

CROSS-REFERENCE TO RELATED APPLICATIONS

This application is based upon and claims the benefit of priority from the prior Japanese Patent Application No. 2000-162082, filed May 31, 2000, the entire contents of which are incorporated herein by reference.

BACKGROUND OF THE INVENTION

The present invention relates to a radio device control terminal apparatus for controlling a plurality of radio devices, between which a radio connection is established by exchanging identify information (identifiers). The invention also relates to a radio system including the radio devices and the radio device control terminal apparatus, and further, to a method for constituting a multimedia system of a plurality of devices having wireless communication means.

Jpn. Pat. Appln. KOKAI Publication No. 6-225366, for example, discloses a structure having a radio communication function of establishing a radio connection using an identifier. Specifically, it discloses a system and method that selectively realize interactive communication between a predetermined pair of transceivers. In this system, a cable is used to directly connect the two radio devices (transceivers) to each other, and identifiers are used to enable interactive communication (secret communication). Further, this system employs a special hardware interface for establishing a wired connection.

However, the system requires a lot of time and effort up to the point where the cable is connected and communication is actually enabled. Moreover, more than one radio line cannot be connected at one time.

Furthermore, when establishing a connection between a number of radio devices having no high-quality user interfaces, the same operational problems occur, requiring much time and effort.

BRIEF SUMMARY OF THE INVENTION

The present invention has been developed in light of the above, and it's object is to provide a radio device control terminal apparatus and a radio system capable of easily and promptly establishing a connection between any combination of a number of radio devices by a simple operation with no cables, and also provide a method for constituting a multimedia system.

According to one aspect of the present invention, there is provided a radio device control terminal apparatus for controlling an establishment of a radio connection between radio devices that exist within an area in which the radio devices and the radio device control terminal apparatus can communicate with each other, the radio devices containing identifiers thereof, the radio device control terminal apparatus comprising: wireless communication means for communicating by radio with any one of the radio devices; and processor for transmitting the identifiers necessary for establishing the radio connection to at least two of the radio devices.

According to another aspect of the present invention, there is provided a radio system comprising: a number of radio devices for establishing a radio connection therebetween by exchanging identifiers thereof; and a radio device control terminal apparatus for transmitting identifiers necessary for establishing a radio connection, to any combination of the radio devices, which exist within a communicable area, thereby controlling a radio connection between the any combination, wherein the radio device control terminal apparatus includes: means for detecting those of the radio devices, which exist within the communicable area, and registering identifiers of the detected radio devices when having detected them; means for displaying the detected radio devices so that the detected radio devices can be selected; means for selecting any combination of the displayed radio devices and designating a radio connection between the selected radio devices; and means for transmitting identifiers necessary for establishing a radio connection, to the selected radio devices, using the registered identifiers, when a radio connection between the selected radio devices has been designated, and each of the radio devices includes: means for detecting the radio device control terminal apparatus and the other radio devices, which exist within a communicable area, and transmitting its own identifier to the radio device control terminal apparatus when having detected the radio device control terminal apparatus; and means for receiving, from the radio device control terminal apparatus, an identifier of that one of the other radio devices, to which the each radio device is to be connected, and then establishing a radio connection to the one of the other radio devices, using the received identifier.

According to still another aspect of the present invention, there is provided a method of constituting a multimedia system for exchanging multimedia information that at least includes image information, voice information and character information, comprising the steps of: controlling an establishment of a radio connection between a plurality of devices having wireless communication means, using another device having wireless communication means; and exchanging the multimedia information between at least two of the devices connected by radio after the establishment of the radio connection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram illustrating the entire structure of a system according to a first embodiment of the invention, including examples of first, second and third screens for establishing a radio connection used in the invention;

DETAILED DESCRIPTION OF THE INVENTION

Figure 2:
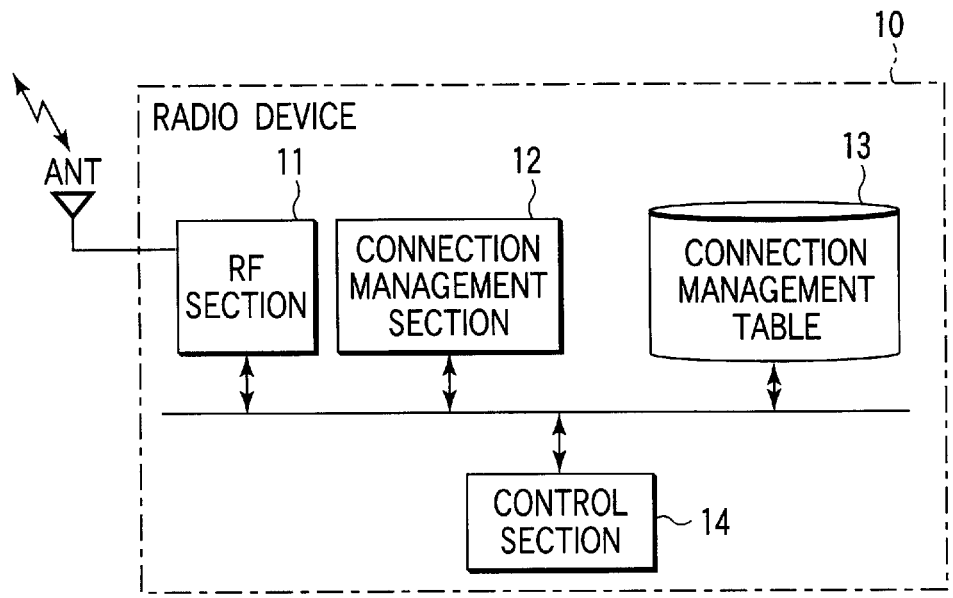
FIG. 2 is a block diagram illustrating the internal structure of one of the radio devices appearing in FIG. 1.

The embodiment of the invention will be described with reference the accompanying drawings.

FIG. 1 is a block diagram illustrating a basic structure of a system according to the embodiment of the invention. FIG. 1 also shows an example of an operation for connection executed when the user gives an instruction to establish radio connection, using a radio device control terminal.

In FIG. 1, reference numeral 10 denotes a device with a radio communication function as a target for which radio connection is to be established. In this case, radio connection is established between only two devices, one of which will be referred to as "radio device A", and the other will be referred to as "radio device B". The radio devices 10 establish radio connection by exchanging identifiers therebetween, thereby exchanging information. In the system of the present invention, radio connection is established between the radio devices 10 for the first time when they have received the identifiers of their respective destinations via a radio device control terminal described later.

Reference numeral 20 denotes a device, which has a radio communication function for controlling the establishment of radio connection using the identifiers of the radio devices 10, and which is called a radio device control terminal in this specification. When the radio device control terminal 20 has detected radio devices (stations) (A)10 and (B)10 in a communicable area (where radio connection can be established) set by the radio communication function, it displays the detected radio devices as targets of radio connection establishment on its coordinate-input-enabled display section, and designates the establishment of a connection between the radio devices on the display section, thereby transmitting the identifier of one of the radio devices (A)10 and (B)10 to the other and vice versa.

In the above structure, when the radio device control terminal 20 has detected and displayed the radio devices 10 on its display section, radio connection therebetween can be established. When the radio device control terminal 20 has detected the radio devices (A)10 and (B)10, it displays them as targets of connection establishment on the coordinate-input-enabled display section, and waits for an instruction to connect the radio devices from the user (see screen 1 in (a) of FIG. 1). Suppose that, in this case, the user instructs the terminal 20 to connect the radio devices by inputting the coordinates of the devices using a pen (MC).

When the user has instructed, on the display section, the radio device control terminal 20 to designate the radio devices (A)10 and (B)10 as targets of radio connection establishment, using the pen (MC) (in this case, line connection is executed by operating the pen) (see screens 2 and 3 in (b) and (c) of FIG. 1), the radio device control terminal 20 transmits the identifier of the radio device (A)10 to the radio device (B)10, and the identifier of the radio device (B)10 to the radio device (A)10.

Upon receiving the respective destination identifiers, the radio devices (A)10 and (B)10 establish radio connection therebetween using the identifiers, thereby exchanging information such as multimedia information.

As described above, the structure of using the radio device control terminal 20 for the establishment of radio connection between the radio devices 10 does not require any connection cable, and enables easy and prompt connection control for the radio devices by a simple operation on the screen of the radio device control terminal 20.

Figure 3:
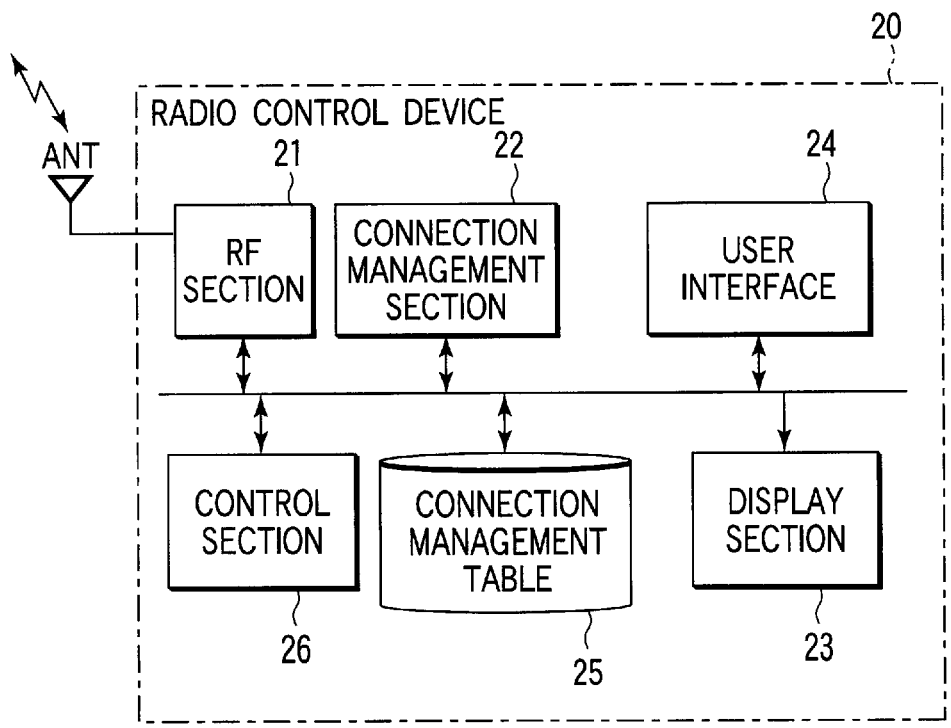
FIG. 3 is a block diagram illustrating the internal structure of a radio device control terminal appearing in FIG. 1.

FIG. 2 is a block diagram illustrating the internal structural elements of the radio device 10 that appears in FIG. 1. FIG. 3 is a block diagram illustrating the internal structural elements of the radio device control terminal 20 that appears in FIG. 1.

In FIG. 2, reference numerals 11–14 denote the structural elements of the radio device 10. Reference numeral 11 denotes a radio signal transmitting/receiving section (Radio Frequency (RF) section) for realizing the radio communication function of the radio device 10. The section 11 transmits or receives a radio signal to or from another radio device, and the radio device control terminal 20, etc. Reference numeral 12 denotes a connection management section for registering and managing the identifier of the radio device 10 under the control of a control section 14 described later. The section 12 manages the identifier of the radio device 10 and the identifier of another radio device, using a connection management table described later. Reference numeral 13 denotes a connection management table to be referred to by the connection management section 12, and registers the identifiers of radio devices as targets for radio connection establishment. Reference numeral 14 denotes a control section for controlling the entire radio device. Specifically, the section 14 executes a process shown in FIG. 5 in a first embodiment, a process shown in FIG. 7 in a second embodiment, a process shown in FIG. 9 in a third embodiment, and a process shown in FIG. 11 in a fourth embodiment.

In FIG. 3, reference numerals 21–26 denote the structural elements of the radio device control terminal 20. Reference numeral 21 denotes a radio signal transmitting/receiving section (RF section) for realizing the radio communication function of the radio device control terminal 20. Reference numeral 22 denotes a connection management section for registering and managing identifiers under the control of a control section 26 described later. Specifically, the section 22 registers the identifiers of detected radio devices 10 in a connection management table, transfers detected radio devices 10 to a display section, and/or transmits an instruction to connect the detected radio devices, using the radio signal transmitting/receiving section (RF section) 21, in response to an instruction to connect them from a user interface section. Reference numeral 23 denotes a display section for displaying, for example, radio devices detected by the connection management section 22. Reference numeral 24 denotes a user interface section provided on the display section 23 and including operation input means such as a touch panel, buttons, etc. The section 24 informs the control section 26 of an instruction made by the user. Reference numeral 25 denotes a connection management table to be referred to by the connection management section 22 and registering the identifiers of detected radio devices 10. The control section 26 controls the entire radio device control terminal 20. Specifically, the control section 26 executes a process shown in FIG. 4 in the first embodiment, a process shown in FIG. 6 in the second embodiment, a process shown in FIG. 8 in the third embodiment, and a process shown in FIG. 10 in the fourth embodiment.

Figure 4:
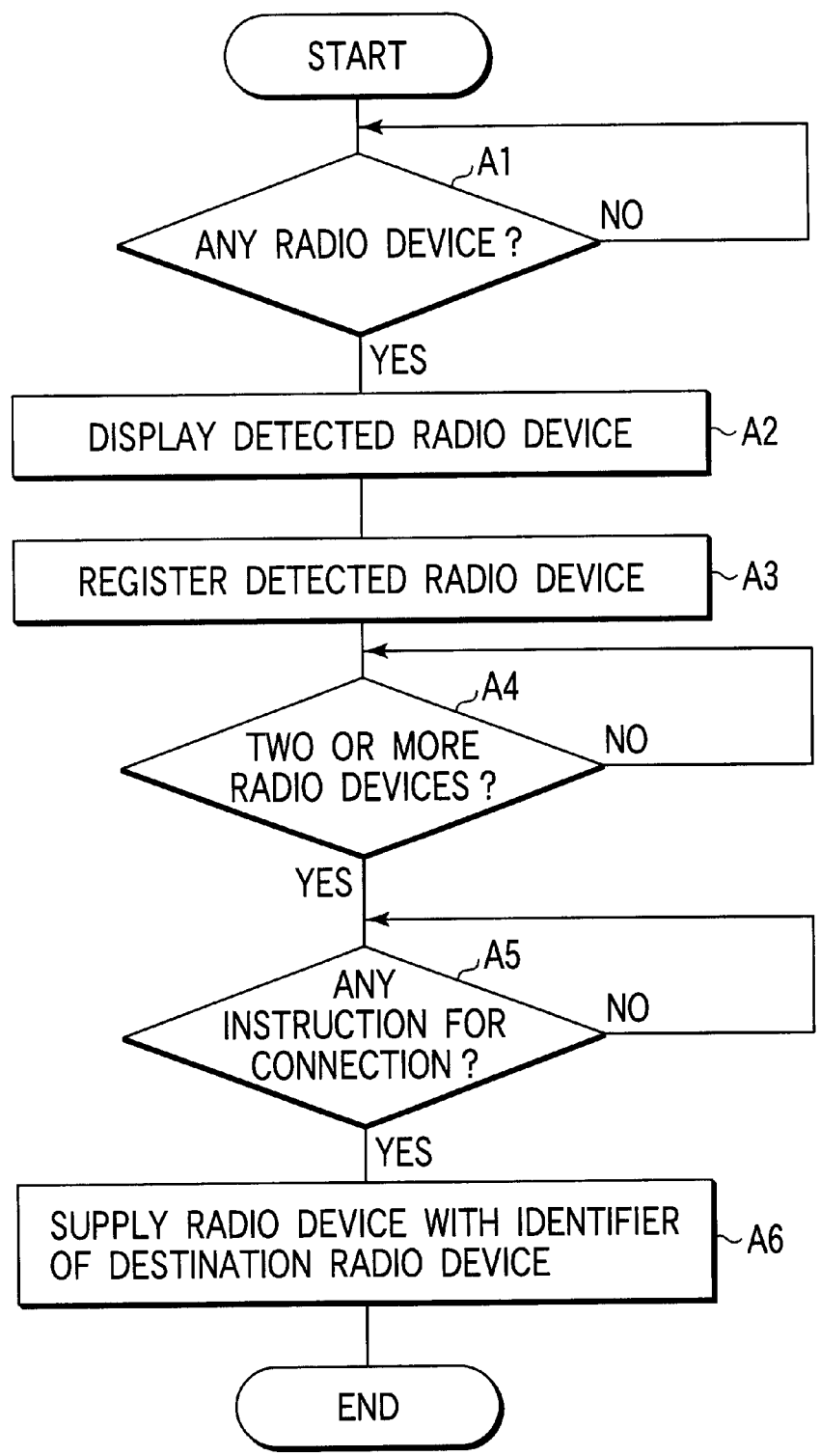
FIG. 4 is a flowchart useful in explaining a processing procedure executed by the radio device control terminal employed in the first embodiment.
Figure 5:
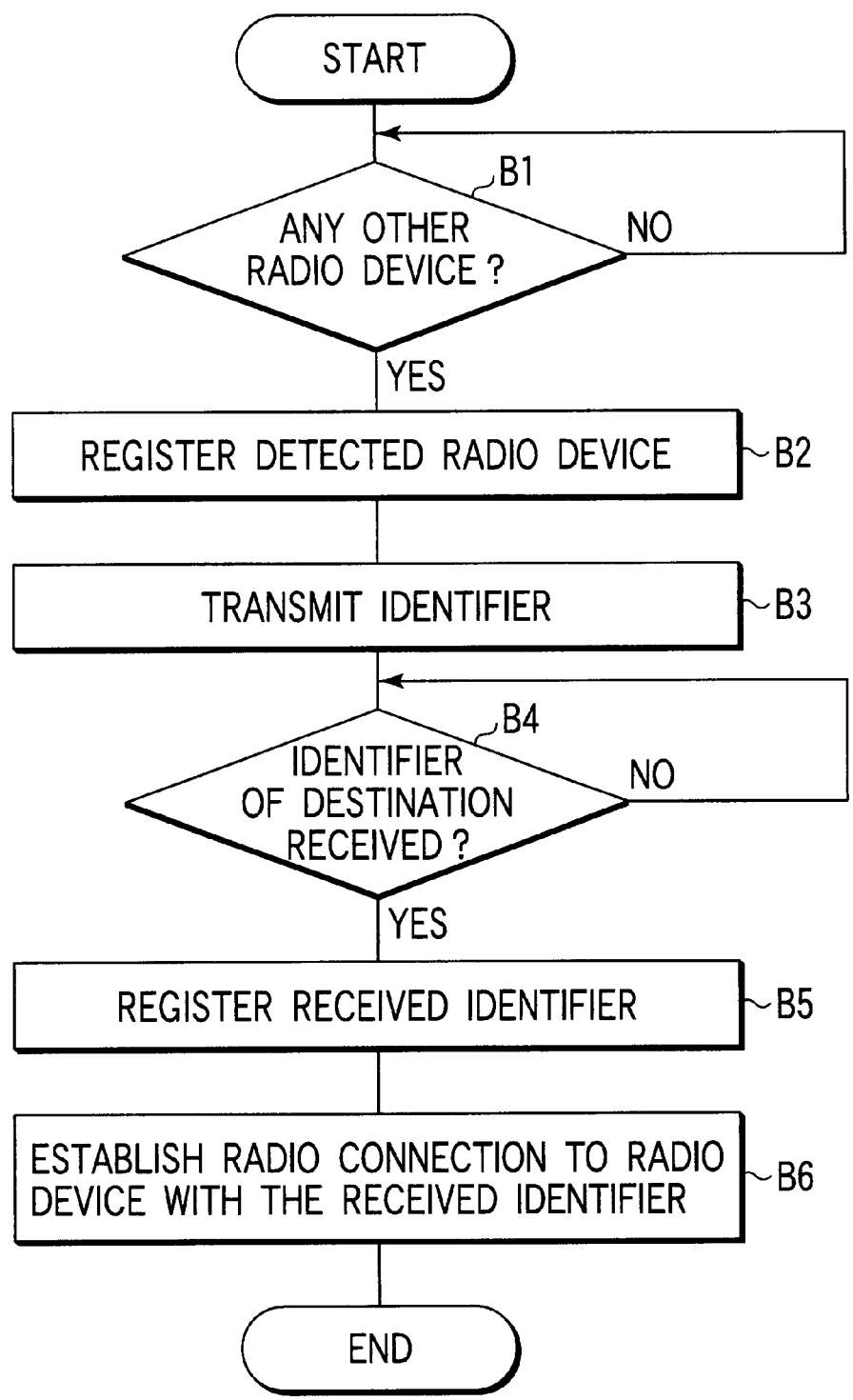
FIG. 5 is a flowchart useful in explaining a processing procedure executed by each radio device employed in the first embodiment.

FIG. 4 is a flowchart useful in explaining the processing procedure executed by the radio device control terminal 20 in the first embodiment. FIG. 5 is a flowchart useful in explaining the processing procedure executed by each radio device 10 in the first embodiment. These figures illustrate a procedure for the establishment of a radio connection between only two radio devices.

Figure 6:
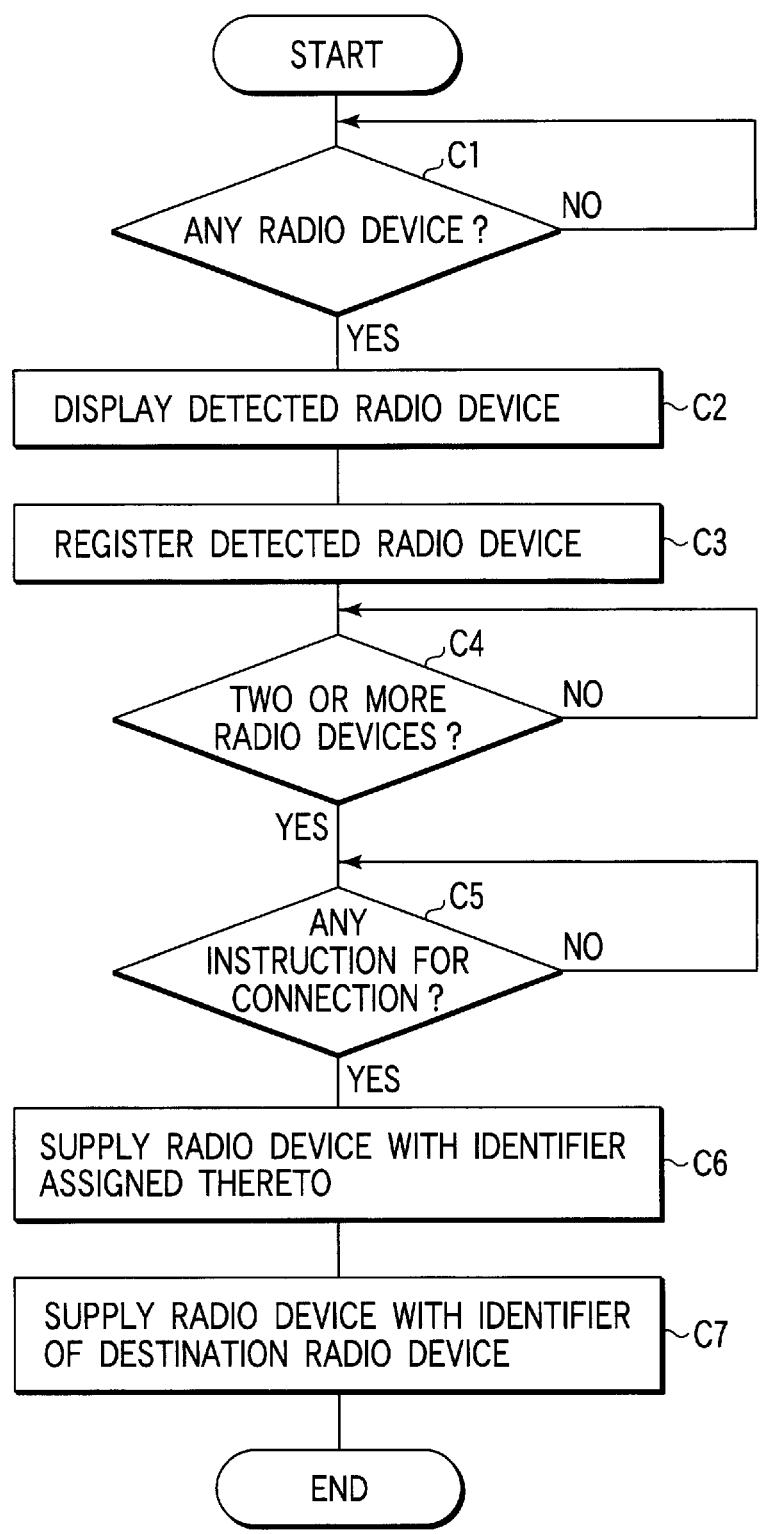
FIG. 6 is a flowchart useful in explaining a processing procedure executed by a radio device control terminal employed in a second embodiment.
Figure 7:
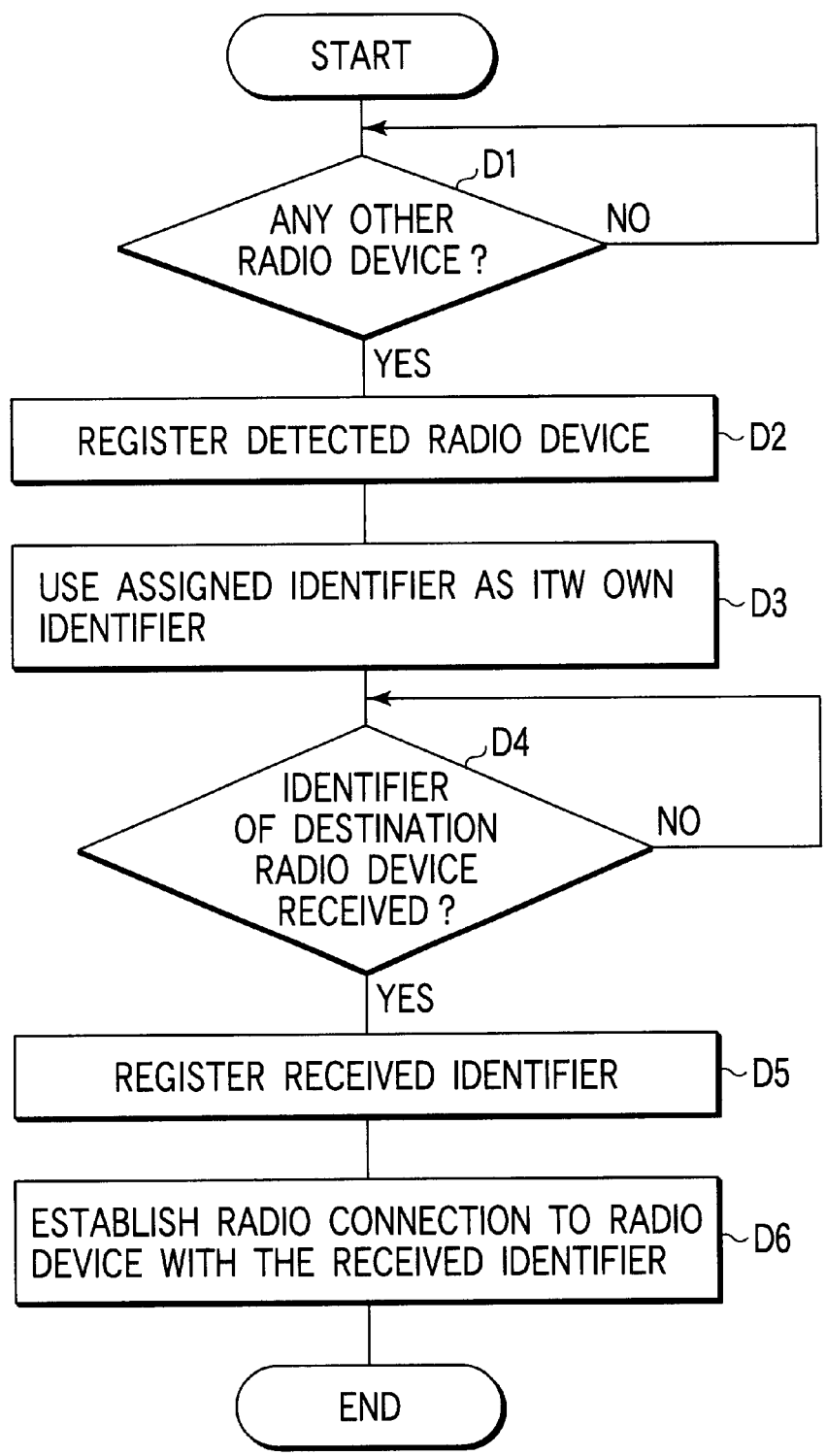
FIG. 7 is a flowchart useful in explaining a processing procedure executed by each radio device employed in the second embodiment.

FIG. 6 is a flowchart useful in explaining the processing procedure executed by the radio device control terminal 20 in the second embodiment. FIG. 7 is a flowchart useful in explaining the processing procedure executed by each radio device 10 in the second embodiment. These figures illustrate a procedure for the establishment of a radio connection between radio devices having no initial identifiers or having variable identifiers.

Figure 8:
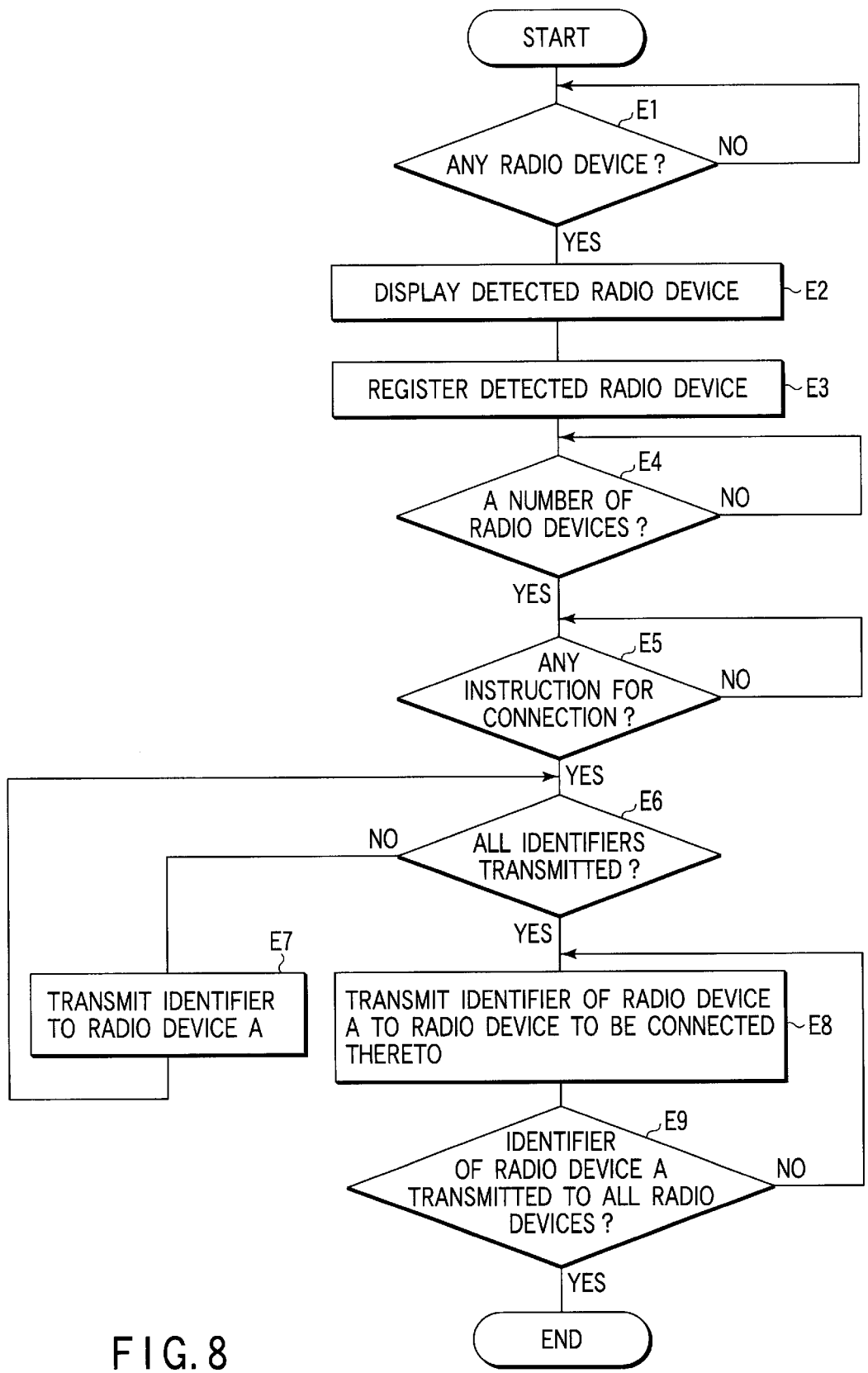
FIG. 8 is a flowchart useful in explaining a processing procedure executed by a radio device control terminal employed in a third embodiment.
Figure 9:
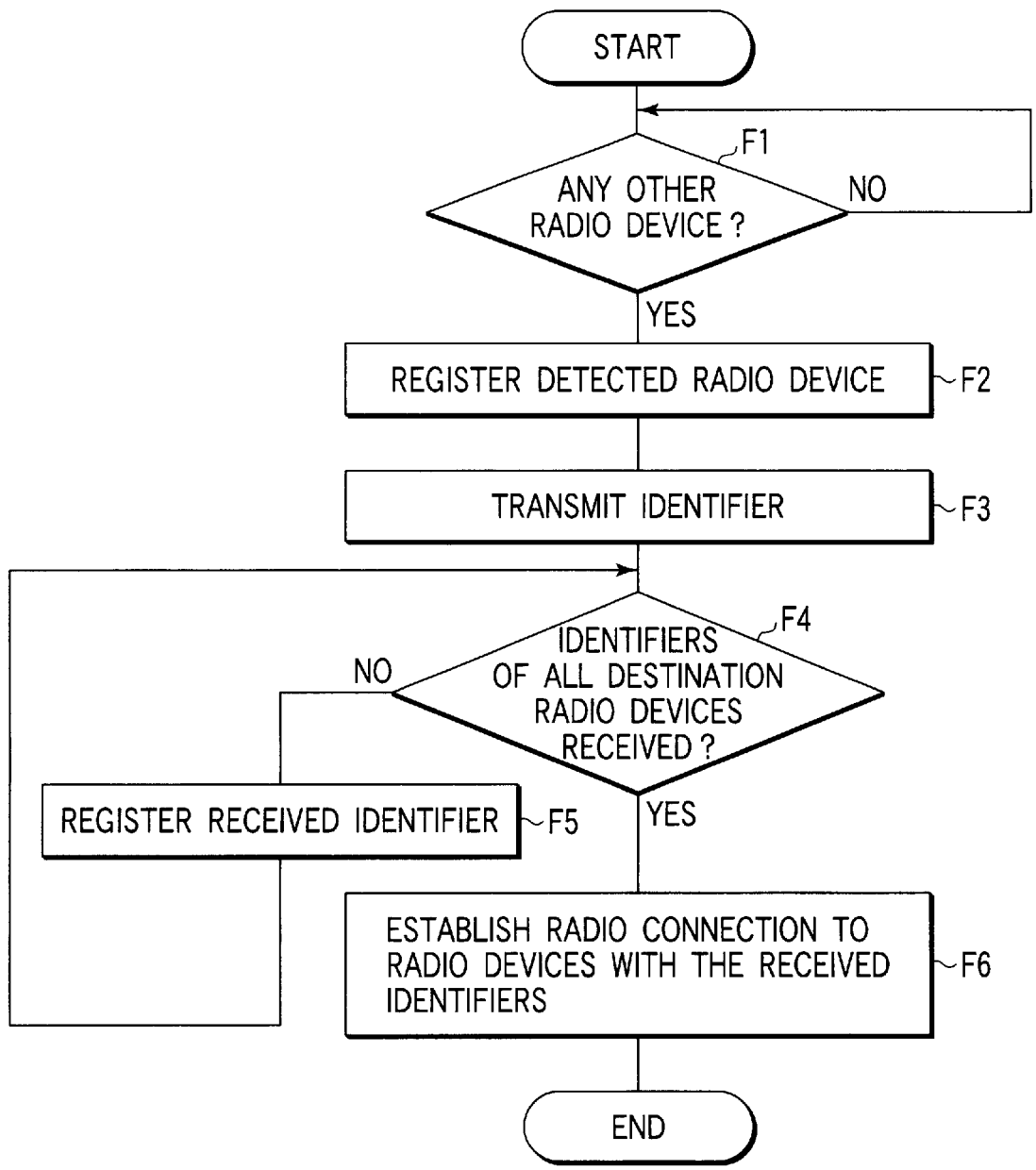
FIG. 9 is a flowchart useful in explaining a processing procedure executed by each radio device employed in the third embodiment.

FIG. 8 is a flowchart useful in explaining the processing procedure executed by the radio device control terminal 20 in the third embodiment. FIG. 9 is a flowchart useful in explaining the processing procedure executed by each radio device 10 in the third embodiment. These figures illustrate a procedure for the establishment of a radio connection between one radio device and a number of radio devices.

Figure 10:
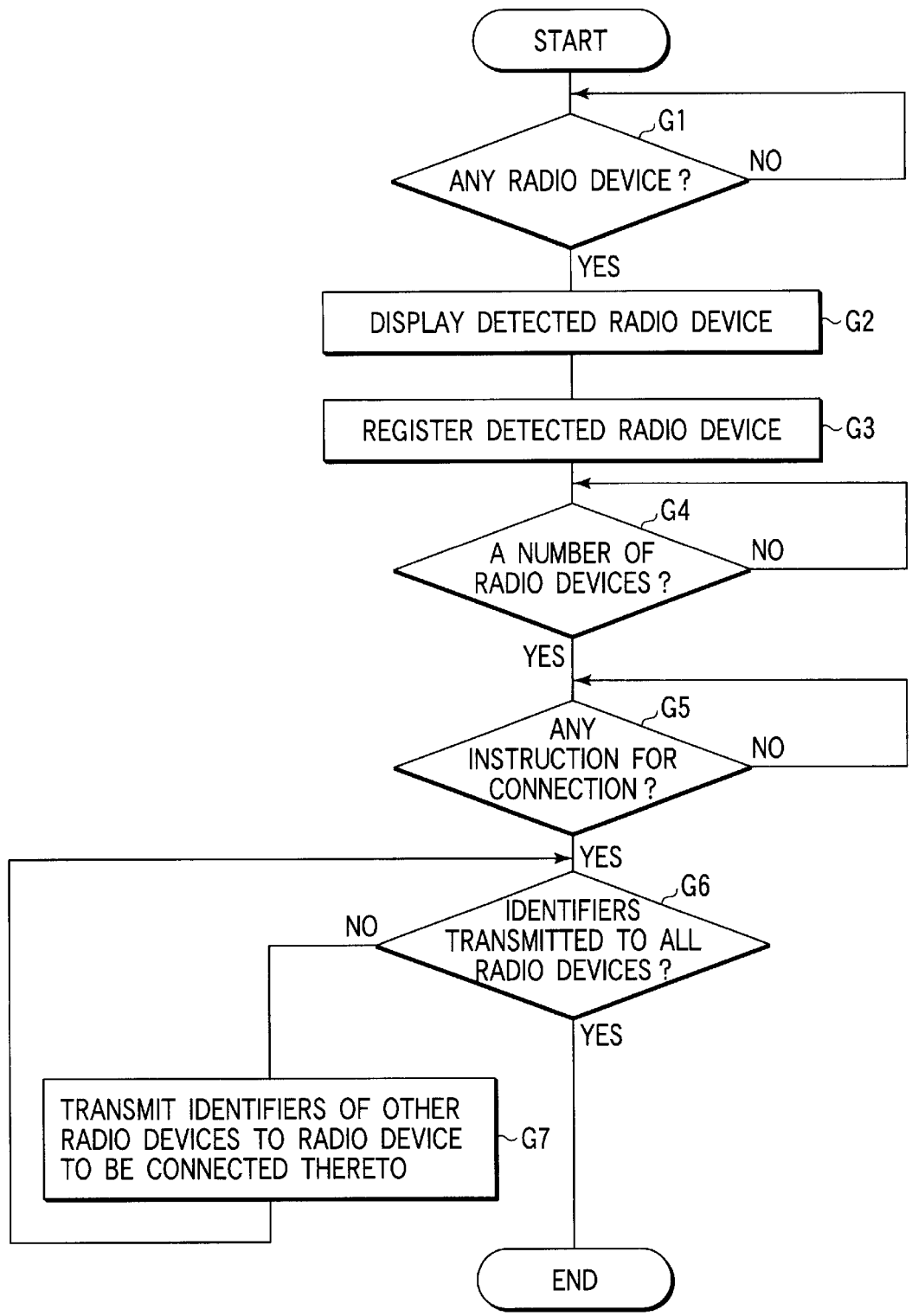
FIG. 10 is a flowchart useful in explaining a processing procedure executed by a radio device control terminal employed in a fourth embodiment.

FIG. 10 is a flowchart useful in explaining the processing procedure executed by the radio device control terminal 20 in the fourth embodiment. FIG. 5 is a flowchart useful in explaining the processing procedure executed by each radio device 10 in the fourth embodiment. These figures illustrate a procedure for the establishment of a radio connection between each of a number of radio devices and each of another number of radio devices.

Referring to the above-mentioned figures, an operation executed in each embodiment will be described.

Referring first to FIGS. 1–5, a description will be given of the operation of establishing a radio connection between only two radio devices, executed in the first embodiment of the invention.

In the radio device (A)10, the radio signal transmitting/receiving section (RF section) 11 determines, upon receiving a radio signal of a predetermined frequency band, that there is another radio device 10 or the radio device control terminal 20 within an area in which the section 11 can transmit a radio signal. When the section 11 has thus detected another radio device 10 or the radio device control terminal 20, it informs the control section 14 of this fact (step B1 in FIG. 5). When the radio device control terminal 20 is detected within the area, the control section 14 registers the identifier of the terminal 20 in the connection management table 13 (step B2 in FIG. 5).

Further, the radio device (A)10 transmits, under the control of the control section 14, its own identifier to the detected radio device control terminal 20 via the connection management table 13 and the radio signal transmitting/receiving section (RF section) 11 (step B3 in FIG. 5).

Similarly, when, in the radio device (B)10, the radio signal transmitting/receiving section (RF section) 11 has detected the radio device control terminal 20 within an area in which the section 11 can transmit a radio signal (step B1 in FIG. 5), the control section 14 registers the identifier of the terminal 20 in the connection management table 13 (step B2 in FIG. 5), thereby transmitting its own identifier to the detected radio device control terminal 20 (step B3 in FIG. 5), as in the case of the radio device (A)10.

On the other hand, in the radio device control terminal 20, the radio signal transmitting/receiving section (RF section) 21 determines, upon receiving a radio signal of a predetermined frequency band, that there is a radio device 10 within an area in which the section 21 can transmit a radio signal. When the section 21 has thus detected any radio device 10, it informs the control section 26 of this fact (step A1 in FIG. 4). The control section 26 in turn displays, on the display section 23, the radio device 10 detected via the connection management section 22 (step A2 in FIG. 4), and registers the identifier of the detected radio device 10 in the connection management table 25 (step A3 in FIG. 4).

If the radio device control terminal 20 detects two or more radio devices 10 (step A4 in FIG. 4), the control section 26 waits for an instruction to establish a radio connection between the radio devices, input by operating the user interface section 24 on the display section 23 (step A5 in FIG. 4). Upon receiving the instruction input by operating the user interface section 24, the control section 26 controls the connection management section 22 and the radio signal transmitting/receiving section (RF section) 21, thereby transmitting respective destination identifiers to the detected radio devices 10 (step A6 in FIG. 4). In this case, the identifier of the radio device (B)10 is transmitted to the radio device (A)10, while the identifier of the radio device (A)10 is transmitted to the radio device (B)10.

FIG. 1 shows examples of operations executed for radio connections. In these examples, radio connections are executed by operating the pen (MC) on the display section 23. Specifically, the two radio devices (A)10 and (B)10 displayed on the display section 23 (see screen 1 in (a) of FIG. 1) are connected to each other (see screen 3 in (c) of FIG. 1) by operating the pen (MC) (see screen 2 in (b) of FIG. 1). As a result, the identifier of the radio device (B)10 is transmitted to the radio device (A)10, while the identifier of the radio device (A)10 is transmitted to the radio device (B)10, as is mentioned above.

When, in the radio device (A)10, the radio signal transmitting/receiving section (RF section) 11 has received the identifier of the radio device (B)10 transmitted from the radio device control terminal 20, it informs the control section 14 of this (step B4 in FIG. 5). The control section 14 in turn registers the identifier of the radio device (B)10 in the connection management table 13 via the connection management section 12 (step B5 in FIG. 5), and establishes a radio connection to the radio device (B)10 using the identifier (step B6 in FIG. 5).

Similarly, when, in the radio device (B)10, the radio signal transmitting/receiving section (RF section) 11 has received the identifier of the radio device (A)10 transmitted from the radio device control terminal 20 (step B4 in FIG. 5), the identifier of the radio device (A)10 is registered in the connection management table 13 via the connection management section 12 (step B5 in FIG. 5), thereby establishing a radio connection to the radio device (A)10 using the identifier (step B6 in FIG. 5).

As described above, the establishment of a radio connection between the radio devices (A)10 and (B)10 can be quickly controlled by a simple operation using the user interface section 24 of the radio device control terminal 20.

Referring then to FIGS. 1–3, 6 and 7, a description will be given of the second embodiment of the invention, in which a radio connection between radio devices having no initial identifiers or having variable identifiers is established. For simplifying the description, no description will be given of the operations of some structural elements of each radio device 10 and the radio device control terminal 20, which can be easily analogized from the first embodiment.

When the radio device (A)10 has detected the radio device control terminal 20 (step D1 in FIG. 7), it registers the identifier of the detected radio device control terminal 20 in the connection management table 13 (step D2 in FIG. 7), and transmits its own identifier to the detected radio device control terminal 20 (step D3 in FIG. 7).

Similarly, when the radio device (B)10 has detected the radio device control terminal 20 (step D1 in FIG. 7), it registers the identifier of the detected radio device control terminal 20 in the connection management table 13 (step D2 in FIG. 7), and transmits its own identifier to the detected radio device control terminal 20 (step D3 in FIG. 7).

On the other hand, when the radio device control terminal 20 has detected a radio device 10 (step C1 in FIG. 6), it displays the detected radio device 10 on the display section 23 (step C2 in FIG. 6), and registers, in the connection management table 25, the identifier, if there is one, of the detected radio device 10 (step C3 in FIG. 6).

Further, when the radio device control terminal 20 has detected two or more radio devices 10 (step C4 in FIG. 6), it waits for an instruction to establish a radio connection between the radio devices, input by operating the user interface section 24 on the display section 23 (step C5 in FIG. 6). Upon receiving the instruction input by operating the user interface section 24, the terminal 20 assigns identifiers to the radio devices 10 having no identifiers or having variable identifiers, thereby transmitting the identifiers to the respective radio devices 10 as a transmitter (or transmitters) and a receiver (or receivers) (step C6 in FIG. 6).

Further, the radio device terminal 20 supplies the radio device 10 as a transmitter with the identifier of the radio device 10 as a receiver (step C7 in FIG. 6).

In this case, identifiers are assigned and transmitted to the radio devices (A)10 and (B)10 having, for example, no initial identifiers. Further, in accordance with the instruction, the identifier assigned to the radio device (A)10 is transmitted to the destination radio device (B)10 (i.e. the receiver), while the identifier assigned to the destination radio device (B)10 is transmitted to the radio device (A)10.

When the radio device (A)10 has received its own identifier and the identifier of the destination radio device (B)10 from the radio device control terminal 20 (step D4 in FIG. 7), it registers the identifiers in the connection management table 13 (step D5 in FIG. 7), and establishes a radio connection to the destination radio device (B)10, using the identifiers (step D4 in FIG. 7).

Similarly, when the radio device (B)10 has received its own identifier and the identifier of the destination radio device (A)10 from the radio device control terminal 20 (step D4 in FIG. 7), it registers the identifiers in the connection management table 13 (step D5 in FIG. 7), and establishes a radio connection to the destination radio device (A)10, using the identifiers (step D4 in FIG. 7).

Thus, even when the detected radio devices 10 do not have any initial identifiers or have variable identifiers, no troublesome operation for connection is required, and the establishment of a radio connection between the radio devices can be controlled easily and promptly by a simple operation using the user interface section 24 of the radio device control terminal 20.

Referring then to FIGS. 1–3, 8 and 9, a description will be given of the third embodiment of the invention, in which a radio connection is established between one radio device and a number of radio devices. For simplifying the description, no description will be given of the operations of some structural elements of each radio device 10 and the radio device control terminal 20, which can be easily analogized from the first embodiment.

When each of a plurality of radio devices 10, 10, . . . has detected the radio device control terminal 20 (step F1 in FIG. 9), it registers the identifier of the detected radio device control terminal 20 in the connection management table 13 (step F2 in FIG. 9), and transmits its own identifier to the detected radio device control terminal 20 (step F3 in FIG. 9).

On the other hand, when the radio device control terminal 20 has detected radio devices 10, 10, . . . (step E1 in FIG. 8), it displays the detected radio devices 10, 10, . . . on the display section 23 (step E2 in FIG. 8), and registers the identifiers of the detected radio devices 10, 10, . . . in the connection management table 25 (step E3 in FIG. 8).

Further, when the radio device control terminal 20 has detected two or more radio devices 10 (step E4 in FIG. 8), it waits for an instruction to establish a radio connection between the radio devices, input by operating the user interface section 24 on the display section 23 (step E5 in FIG. 8).

Suppose that the radio device control terminal 20 receives an instruction to establish a radio connection between one radio device and a number n (n $\geq$ 2) of radio devices, input by operating the user interface section 24 on the display section 23. In this case, at first, the terminal 20 supplies one radio device (e.g. the radio device (A)10) with all the identifiers of the number n of radio devices 10, 10, . . . (steps E6 and E7 in FIG. 8). Then, the terminal 20 transmits the identifier of the one radio device, i.e. the radio device (A)10, to all the number n of radio devices 10, 10, . . . (steps E8 and E9 in FIG. 8).

When the radio device (A)10 has received the identifiers of the number n of radio devices 10, 10, . . . from the radio device control terminal 20 (step F4 in FIG. 9), it registers the identifiers in the connection management table 13 (step F5 in FIG. 9), thereby establishing a radio connection to each of the number n of radio devices 10, 10, . . . , using the identifiers (step F6 in FIG. 9).

As described above, even when an instruction to establish a radio connection between one radio device and a number of radio devices is issued, no troublesome operation for connection is required, and the establishment of a radio connection between the radio devices can be controlled easily and promptly by a simple operation using the user interface section 24 of the radio device control terminal 20.

Referring then to FIGS. 1–3, 10 and 11, a description will be given of the fourth embodiment of the invention, in which a radio connection is established between a number of radio devices and another number of radio devices. For simplifying the description, no description will be given of the operations of some structural elements of each radio device 10 and the radio device control terminal 20, which can be easily analogized from the first embodiment.

Figure 11:
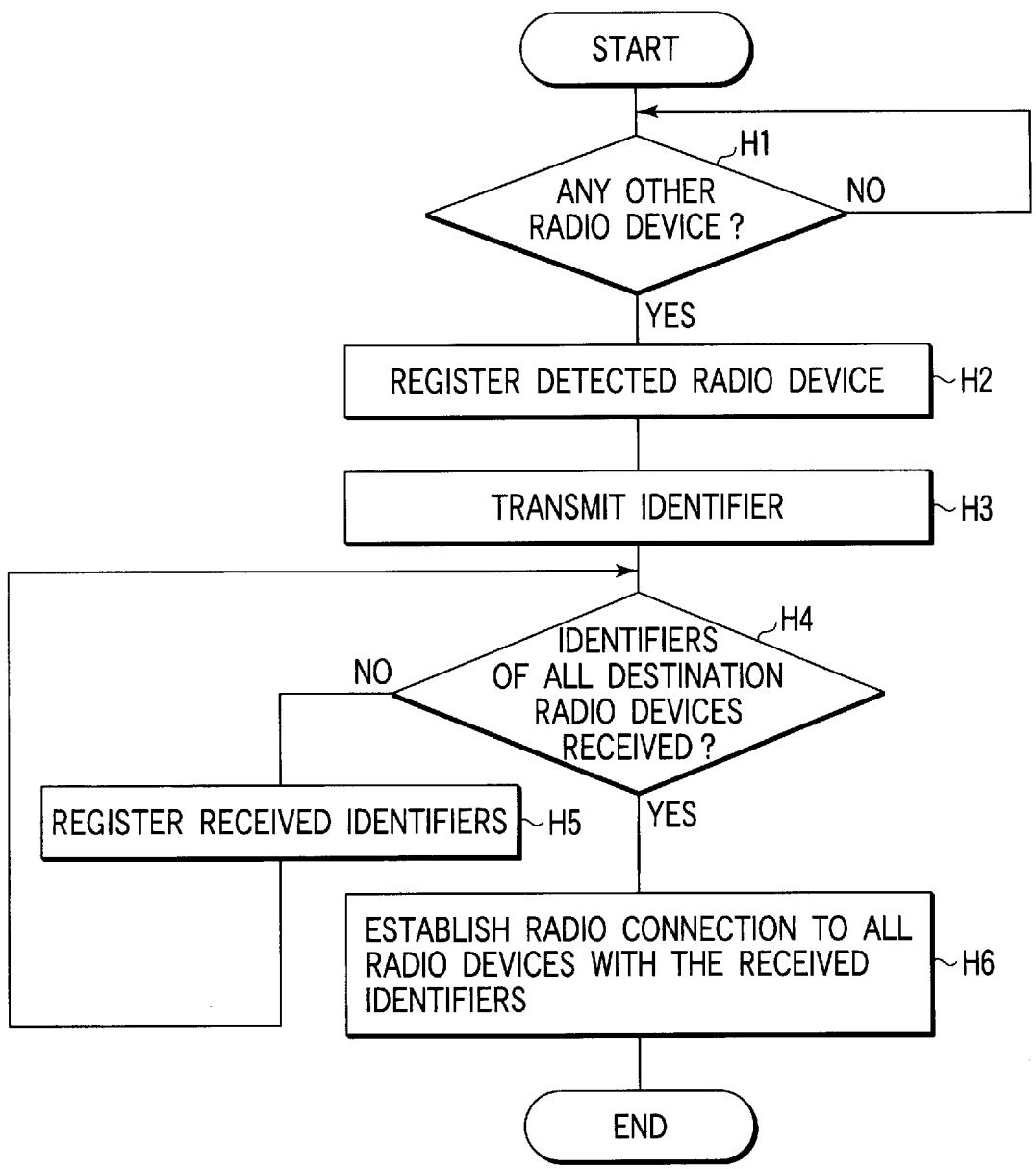
FIG. 11 is a flowchart useful in explaining a processing procedure executed by each radio device employed in the fourth embodiment.

When each of a plurality of radio devices 10, 10, . . . has detected the radio device control terminal 20 (step H1 in FIG. 11), it registers the identifier of the detected radio device control terminal 20 in the connection management table 13 (step H2 in FIG. 11), and transmits its own identifier to the detected radio device control terminal 20 (step H3 in FIG. 11).

On the other hand, when the radio device control terminal 20 has detected the radio devices 10, 10, . . . (step G1 in FIG. 10), it displays the detected radio devices 10, 10, . . . on the display section 23 (step G2 in FIG. 10), and registers the identifiers of the detected radio devices 10, 10, . . . in the connection management table 25 (step G3 in FIG. 10).

Further, when the radio device control terminal 20 has detected two or more radio devices 10 (step G4 in FIG. 10), it waits for an instruction to establish a radio connection between the radio devices, input by operating the user interface section 24 on the display section 23 (step G5 in FIG. 10).

Suppose that the radio device control terminal 20 receives an instruction to establish a radio connection between a number m (m ≧2) of radio devices and a number n (n ≧2) of radio devices, input by operating the user interface section 24 on the display section 23. In this case, at first, the terminal 20 supplies each of the number m of radio devices 10, 10, . . . with all the identifiers of the number n of radio devices 10, 10, . . . and then supplies each of the number n of radio devices 10, 10, . . . with all the identifiers of the number m of radio devices 10, 10, . . . (steps G6 and G7 in FIG. 10).

When each of the number m of radio devices 10, 10, . . . and the number n of radio devices 10, 10, . . . has received the identifiers of all its destination radio devices from the radio device control terminal 20 (step H4 in FIG. 11), it registers the identifiers in the connection management table 13 (step H5 in FIG. 11), thereby establishing a radio connection to each of the number n of radio devices 10, 10, . . . , using the identifiers (step H6 in FIG. 11).

As described above, even when an instruction to establish a radio connection between a number of radio devices and another number of radio devices is issued, no troublesome operation for connection is required, and the establishment of a radio connection between the radio devices can be controlled easily and promptly by a simple operation using the user interface section 24 of the radio device control terminal 20.

Moreover, the application of the above-described radio devices 10, 10, . . . and the radio device control terminal 20, which have a function of controlling the establishment of a connection between the radio devices, for a multimedia system including a plurality of types of devices that process voice, characters, etc., enables a multimedia device of a desired function, and a multifunctional multimedia system, etc. to be easily constructed.

Figure 15:
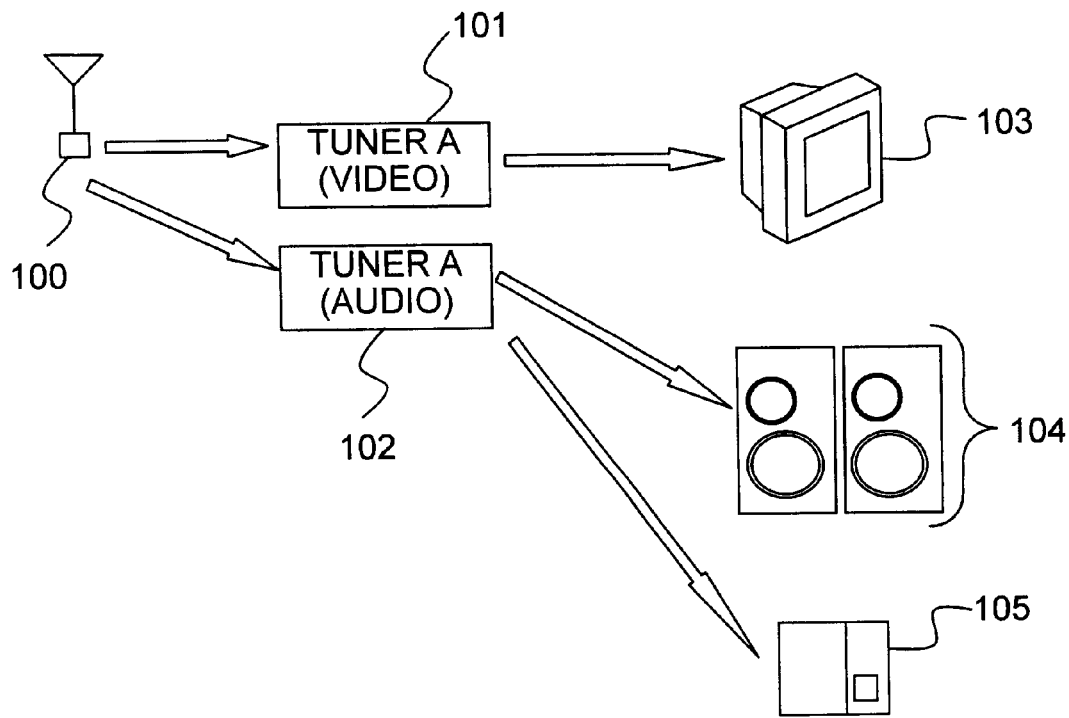
FIG. 15 is a block diagram illustrating a multimedia system having hierarchical and classific interconnection according to one modification of the fourth embodiment of the present invention.

In one modification of this embodiment, a multimedia system having hierarchical and classific interconnection as shown in FIG. 15 may be realized.

In this system, the radio device control terminal 20 acts as a proxy for a plurality of organized connections between multimedia devices.

According to a processing of the identifiers of the devices, an antenna for receiving a digital broadcasting wave 100, a tuner A for video 101, a tuner B for audio 102, a TV 103, speakers 104, and personal stereo 105 are interconnected in orderly sequence, thus constituting the multimedia system.

Needless to say that an addition/elimination of devices is available by changing the way of connections.

In the above-described embodiments, a radio connection between only two radio devices, between one radio device and a number of radio devices, and between a number of radio devices and another number of radio devices is executed, using a radio connection establishment screen as shown in FIG. 1. However, the present invention is not limited to this. For example, a screen for the establishment of a radio connection, as shown in FIG. 12, 13 or 14, enables the establishment of a more user-friendly radio connection.

Figure 12:
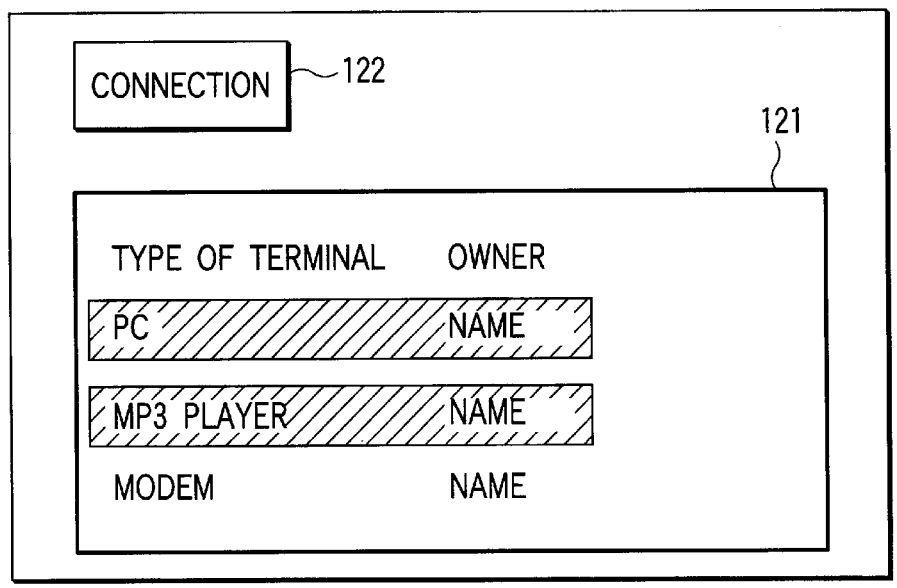
FIG. 12 is a view illustrating another example of a first screen for establishing a radio connection used in the invention.

In the case of using a radio-connection-establishing screen as shown in FIG. 12, the radio device control terminal 20 displays the type and the owner of any detected radio device as a target of connection on the display section 23, so that they can be selected. In FIG. 12, reference numeral 121 denotes a connectable-device-designating area for displaying any detected connectable radio device, and reference numeral 122 a connection designating button. In this case, any detected connectable radio device is displayed in the connectable-device-designating area 121, and the attribute of display is changed as indicated by the hatched portions in FIG. 12, when the user has selected an item (items) in the connectable-device-designating area. When the connection-designating button 122 is clicked after a radio device to be connected is selected in the area 121, the designation of the establishment of a connection is completed.

Figure 13:
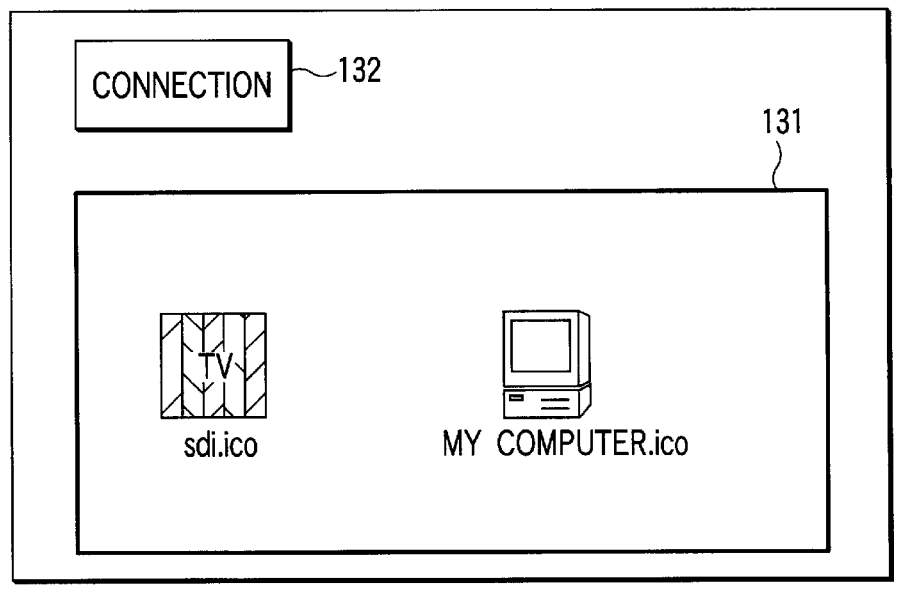
FIG. 13 is a view illustrating another example of a second screen for establishing a radio connection used in the invention.

In the case of using a radio-connection-establishing screen as shown in FIG. 13, the radio device control terminal 20 displays, on the display section 23, a symbol mark (icon) peculiar to any detected radio device as a target of connection, so that the symbol mark can be selected. In FIG. 13, reference numeral 131 denotes a connectable-device-designating area for displaying a symbol mark peculiar to any detected connectable radio device. Reference numeral 132 denotes a connection-designating button. In this case, a symbol mark (icon) peculiar to any detected connectable radio device is displayed in the connectable-device-designating area 121, and the attribute of display is changed when the user has selected an item (items) in the connectable-device-designating area. When the connection designating button 132 is clicked after a radio device to be connected is selected in the area 131, the designation of the establishment of a connection is completed. This way of designation can be modified to the way using a "drag and drop" operation executed by operating a mouse.

Figure 14:
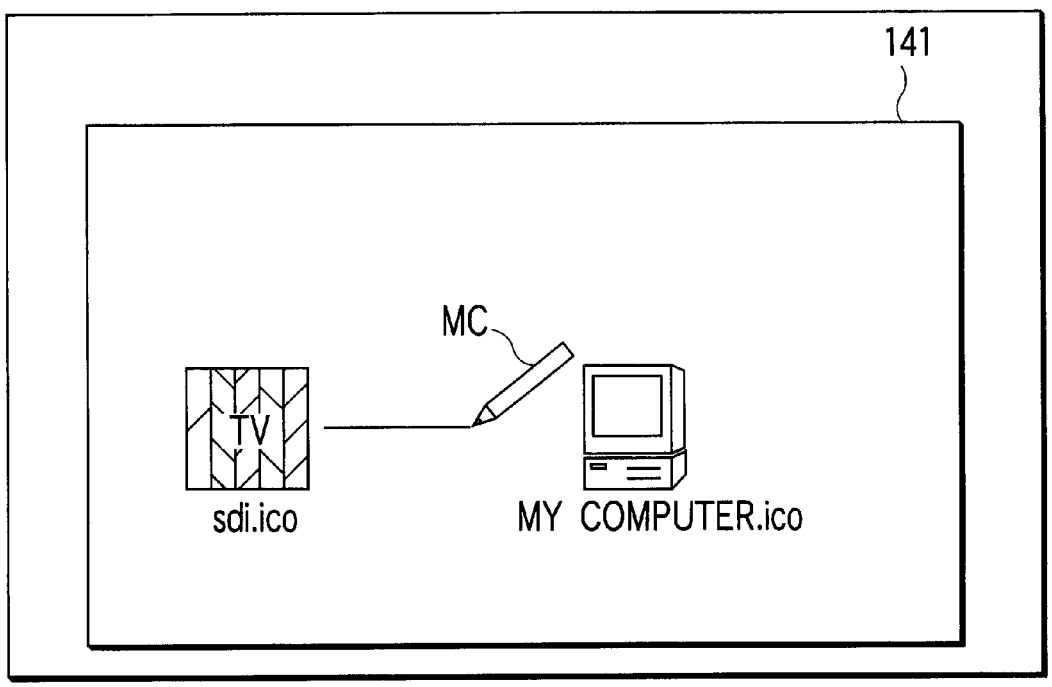
FIG. 14 is a view illustrating another example of a third screen for establishing a radio connection used in the invention.

In the case of using a radio-connection-establishing screen as shown in FIG. 14, the radio device control terminal 20 displays, on the display section 23, a symbol mark (icon) peculiar to any detected radio device as a target of connection, so that the symbol mark can be selected. In this case, the designation of connection is executed using a pen (MC). In the figure, reference numeral 141 denotes a connectable-device-designating area for displaying a symbol mark peculiar to any detected connectable radio device. The designation of the establishment of a connection is completed when to-be-connected radio devices are connected to each other by operating the pen (MC). This way of designation can be modified to the way using a "drag and drop" operation executed by operating the pen (MC).

The selective use of the above-described radio-connection-establishing screens in accordance with the system structure, the environment and/or the purpose, etc. enables a more user-friendly radio connection.

As described above in detail, the present invention enables easy and prompt establishment of a radio connection between radio devices by a simple operation, thereby realizing user-friendly radio communication. It also enables easy and prompt establishment, by a simple operation, of a radio connection between radio devices that includes a device having no user interface, thereby realizing user-friendly radio communication. Furthermore, the present invention can easily realize diversification and expansion of a system structure, using radio network. In addition, it can easily provide a user-friendly multi-functional multimedia system comprising a plurality of devices for processing images, voices and characters, etc., respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio device control terminal apparatus for controlling an establishment of a radio connection between radio devices, the radio devices containing identifiers thereof and establishing the radio connection by exchanging the identifiers, the radio device control terminal apparatus comprising:
    wireless communication means having a cover area, for transmitting a radio wave and communicating by radio with the radio devices;
    detection means for detecting the radio devices by determining whether the radio devices exist within the cover area of the radio wave transmitted from the wireless communication means;
    display means for displaying the radio devices detected by the detection means;
    registration means for registering identifiers of the radio devices detected by the detection means;
    a user interface for designating any combination of the radio devices displayed by the display means, for establishing the radio connection between devices in said any combination; and
    a processor for operating, when the user interface has designated any combination of the displayed radio devices, to transmit identifiers necessary for establishing the radio connection, to the designated radio devices via the wireless communication means, using the identifiers registered by the registration means.

2. The radio device control terminal apparatus according to claim 1, wherein when the user interface has designated establishment of a radio connection between only two of the displayed radio devices, or between one of the displayed radio devices and the other displayed device radio devices, or between some of the displayed radio devices and the other displayed radio devices, the processor transmits the identifiers necessary for establishing a radio connection, to the designated radio devices.

3. The radio device control terminal apparatus according to claim 1, wherein the processor includes means for operating, if the displayed radio devices have no initial identifiers or have variable identifiers, to issue identifiers necessary for establishing a radio connection and to impart the issued identifiers to the radio devices, thereby enabling the establishment of a radio connection therebetween.

4. The radio device control terminal apparatus according to claim 1, wherein the user interface includes coordinate input means for designating, on a display screen of the display means, and radio device for which a radio connection is to be established.

5. A radio system comprising:
    a number of radio devices for establishing a radio connection therebetween by exchanging identifiers thereof; and
    a radio device control terminal apparatus for controlling an establishment of a radio connection between the radio devices, including:
    wireless communication means having a cover area, for transmitting a radio wave and communicating by radio with the radio devices;
    detection means for detecting the radio devices by determining whether the radio devices exist within the cover area of the radio wave transmitted from the wireless communication means;
    display means for displaying the radio devices detected by the detection means;
    registration means for registering identifiers of the radio devices detected by the detection means;
    a user interface for designating any combination of the radio devices displayed by the display means, for establishing the radio connection between devices in said any combination; and
    a processor for operating, when the user interface has designated any combination of the displayed radio devices, to transmit identifiers necessary for establishing the radio connection, to the designated radio devices via the wireless communication means, using the identifiers registered by the registration means.

6. A radio system comprising:
    a number of radio devices for establishing a radio connection therebetween by exchanging identifiers thereof; and
    a radio device control terminal apparatus for transmitting identifiers necessary for establishing a radio connection, to any combination of the radio devices, which exist within a communicable area, thereby controlling a radio connection between said any combination,
    wherein the radio device control terminal apparatus includes:
    means for detecting those of the radio devices, which exist within the communicable area, and registering identifiers of the detected radio devices when having detected them;
    means for displaying the detected radio devices so that the detected radio devices can be selected;
    means for selecting any combination of the displayed radio devices and designating a radio connection between the selected radio devices; and
    means for transmitting identifiers necessary for establishing a radio connection, to the selected radio devices, using the registered identifiers, when a radio connection between the selected radio devices has been designated, and each of the radio devices includes:
    means for detecting the radio device control terminal apparatus and the other radio devices, which exist within a communicable area, and transmitting its own identifier to the radio device control terminal apparatus when having detected the radio device control terminal apparatus; and means for receiving, from the radio device control terminal apparatus, an identifier of that one of the other radio devices, to which said each radio device is to be connected, and then establishing a radio connection to said one of the other radio devices, using the received identifier.

* * * * *